United States Patent
Li et al.

(10) Patent No.: US 8,194,418 B2
(45) Date of Patent: Jun. 5, 2012

(54) FREQUENCY-HOPPING CONTROL METHOD AND MODULE, AND DC/DC CONVERTER

(75) Inventors: Mingzhu Li, Taipei (TW); Qinglin Zhao, Taipei (TW); Zhihong Ye, Taipei (TW); Xuefeng Tang, Taipei (TW); Dinghui Cai, Taipei (TW)

(73) Assignees: Silitek Electronic (Guangzhou) Co. Ltd., Guangzhou (CN); Lite-On Technology Corp., Taipei (TW)

( * ) Notice: Subject to any disclaimer, the term of this patent is extended or adjusted under 35 U.S.C. 154(b) by 376 days.

(21) Appl. No.: 12/591,460

(22) Filed: Nov. 20, 2009

(65) Prior Publication Data

US 2011/0026279 A1    Feb. 3, 2011

(30) Foreign Application Priority Data

Jul. 30, 2009    (CN) .......................... 2009 1 0041634

(51) Int. Cl.
    *H02M 3/335*    (2006.01)
(52) U.S. Cl. .............................. 363/17; 363/98; 363/132
(58) Field of Classification Search .................... 363/16, 363/17, 21.04, 21.02, 95, 97, 98, 131, 132
    See application file for complete search history.

(56) References Cited

U.S. PATENT DOCUMENTS

| | | | | |
|---|---|---|---|---|
| 4,098,244 A | * | 7/1978 | Sumiyoshi et al. | 123/406.23 |
| 5,625,539 A | * | 4/1997 | Nakata et al. | 363/17 |
| 6,396,722 B2 | * | 5/2002 | Lin | 363/98 |
| 6,456,050 B1 | * | 9/2002 | Agiman | 323/282 |
| 6,643,145 B1 | * | 11/2003 | Harrison | 363/16 |
| 6,859,486 B1 | * | 2/2005 | Mohebbi | 375/132 |
| 7,132,818 B2 | * | 11/2006 | Matsuura | 323/222 |
| 7,791,909 B2 | * | 9/2010 | Koo et al. | 363/21.02 |
| 8,054,654 B2 | * | 11/2011 | Kato | 363/21.04 |
| 2002/0126736 A1 | * | 9/2002 | Khayrallah et al. | 375/132 |

* cited by examiner

*Primary Examiner* — Adolf Berhane
(74) *Attorney, Agent, or Firm* — Rosenberg, Klein & Lee

(57) ABSTRACT

A frequency-hopping control method is performed by a frequency-hopping control module that generates a driving signal for driving a voltage converting circuit to generate an output voltage. The method includes, generating a control signal according to a regulating signal inversely proportional to the output voltage of the voltage converting circuit. The control signal is cyclical, and each cycle of which includes an off-time having a variable duration with an inverse relation to magnitude of the regulating signal, and an on-time having a substantially fixed duration. The driving signal is generated according to the control signal and a periodic pulse signal. Therefore, the output voltage can be stabilized, and the voltage converting circuit can perform voltage conversion with reduced power loss and improved voltage conversion efficiency.

20 Claims, 7 Drawing Sheets

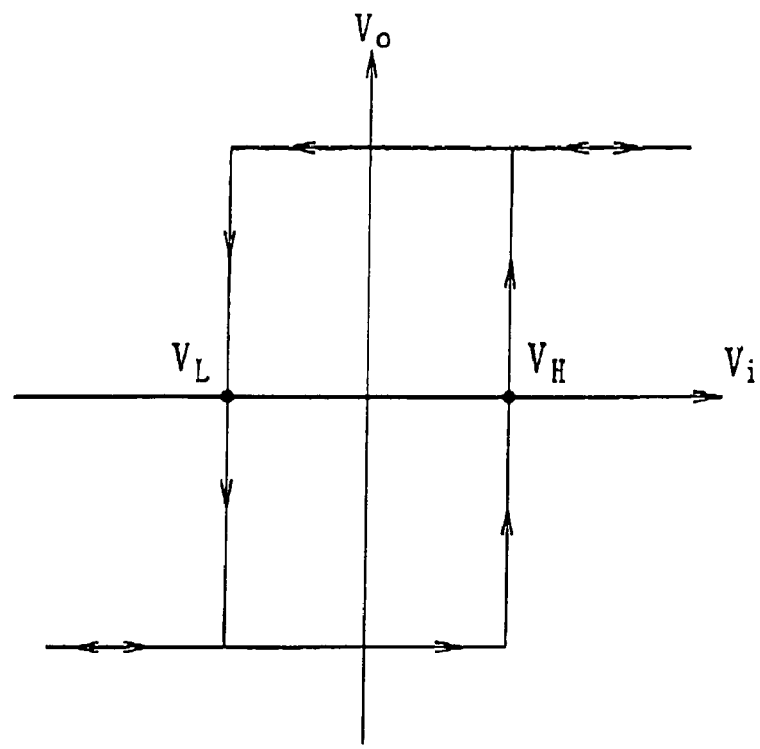
F I G. 5
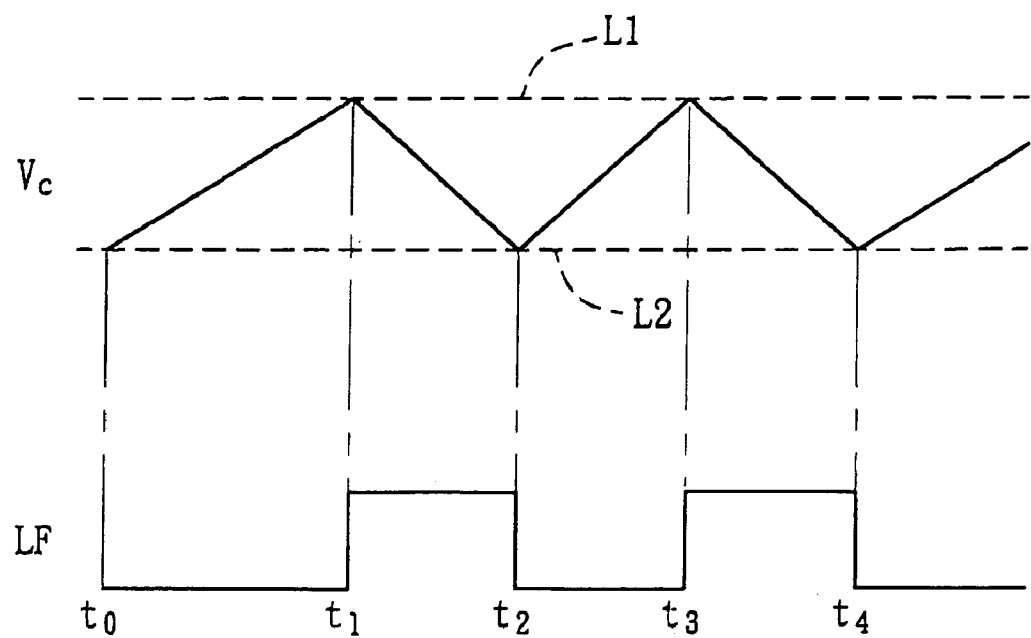
F I G. 6

FREQUENCY-HOPPING CONTROL METHOD AND MODULE, AND DC/DC CONVERTER

CROSS-REFERENCE TO RELATED APPLICATION

This application claims priority of Chinese Application No. 200910041634.0, filed on Jul. 30, 2009.

BACKGROUND OF THE INVENTION

1. Field of the Invention

The present invention relates to a voltage-conversion control method, more particularly to a frequency-hopping control method for a voltage converting circuit that operates in a frequency-hopping mode.

2. Description of the Related Art

Referring to FIG. 1, a conventional DC/DC converting device 900 includes a DC/DC converter 901 and a feedback control circuit 902. The DC/DC converter 901 is a half-bridge LLC oscillating circuit. The feedback control circuit 902 includes an ST L6599 control chip 903.

As the load current decreases (as a result of increasing load resistance $R_o$), the output voltage $V_o$ of the DC/DC converter 901 increases slightly, causing the voltage at node A, $V_{comp}$, to drop. When $V_{comp}$ drops below a preset voltage of the control chip 903, the feedback control circuit 902 stops generating driving signals HVG and LVG, which drive the DC/DC converter 901, such that the DC/DC converter 901 stops voltage conversion operation thereof. During an off-time of the DC/DC converter 901, the output voltage $V_o$ of the DC/DC converter 901 drops slightly, causing $V_{comp}$ to rise. Once $V_{comp}$ reaches a preset voltage, the feedback control circuit 902 resumes output of the driving signals HVG and LVG, and the DC/DC converter 901 transitions to an on-time.

Therefore, the conventional feedback control circuit 902 controls the operating state of the DC/DC converter 901 according to $V_{comp}$. Further referring to FIG. 2, $V_{comp}$ is a gradually-changing voltage. That is to say, during each on-time, duration of $V_{comp}$ dropping to the preset voltage of the control chip 903 (see duration marked by t91-t92) is too long in relation to the change in the output voltage $V_o$. As a result, the DC/DC converter 901 operates for longer than an optimized on-time. As shown by the inductor current $I_{pri}$ in FIG. 2, the cycles of $I_{pri}$ during the duration marked by t91-t92 in the on-time convert only a small proportion of the input energy. Therefore, the efficiency of the conventional DC/DC converting device 900, in terms of power loss, deteriorates if the on-time is too long.

SUMMARY OF THE INVENTION

Therefore, an object of the present invention is to provide a frequency-hopping control method capable of reducing power consumption.

Accordingly, the frequency-hopping control method of the present invention is to be performed by a frequency-hopping control module that is suitable for use with a voltage converting circuit and that generates a driving signal for driving the voltage converting circuit when the voltage converting circuit operates in a frequency-hopping mode such that the voltage converting circuit generates an output voltage. The frequency-hopping control method includes: a first step of generating a periodic pulse signal; a second step of generating a control signal according to a regulating signal that is inversely proportional to the output voltage of the voltage converting circuit, wherein control signal is cyclical and each cycle of the control signal includes an off-time and an on-time, the on-time having a substantially fixed duration, the off-time having a variable duration that has an inverse relation to magnitude of the regulating signal; and a third step of generating a driving signal according to the control signal and the pulse signal for driving the voltage-converting circuit.

Preferably, in the second step, the regulating signal is for controlling an output current of a voltage-controlled current source, and the duration of the off-time corresponds to duration of charging of a storage capacitor to a first threshold voltage using the output current of the voltage-controlled current source.

Preferably, in the second step, the duration of the on-time corresponds to duration of discharging of the storage capacitor via a resistor to a second threshold voltage lower than the first threshold voltage.

Preferably, in the third step, the driving signal is generated by performing a logic AND operation on the control signal and the pulse signal.

Another object of the present invention is to provide a frequency-hopping control module capable of reducing power consumption.

Accordingly, a frequency-hopping control module of the present invention is suitable for use with a voltage converting circuit and is capable of generating a driving signal for driving the voltage converting circuit when the voltage converting circuit operates in a frequency-hopping mode such that the voltage converting circuit generates an output voltage. The frequency-hopping control module includes a high-frequency signal generator, an off-time regulator, and a driving signal-generating circuit. The high-frequency signal generator is for generating a periodic pulse signal. The off-time regulator is for generating a control signal according to a regulating signal that is inversely proportional to the output voltage of the voltage converting circuit. The control signal is cyclical and each cycle of the control signal includes an off-time and an on-time. The on-time has a substantially fixed duration, and the off-time has a variable duration that has an inverse relation to magnitude of the regulating signal. The driving signal-generating circuit is coupled to the high-frequency signal generator and the off-time regulator for generating the driving signal according to the control signal and the pulse signal.

Preferably, the off-time regulator includes a voltage-controlled current source, a storage capacitor, and a hysteretic comparator. The voltage-controlled current source is for generating an output current according to the regulating signal. The storage capacitor has a first terminal coupled to the voltage-controlled current source, and a grounded second terminal. The hysteretic comparator has a non-inverting terminal coupled to the first terminal of the storage capacitor, an inverting terminal to receive a reference voltage, and an output terminal. The hysteretic comparator defines a hysteretic zone according to the reference voltage, and the hysteretic zone defines a first threshold voltage. The hysteretic comparator limits duration of charging of the storage capacitor using the output current of the voltage-controlled current source to the first threshold voltage so as to define the duration of the off-time. The control signal of the off-time regulator is outputted from the output terminal of the hysteretic comparator.

Preferably, the off-time regulator further includes a resistor having a first terminal coupled to the first terminal of the storage capacitor, and a grounded second terminal. The hysteretic zone further defines a second threshold voltage lower than the first threshold voltage. The hysteretic comparator limits duration of discharging of the storage capacitor via the resistor to the second threshold voltage so as to define the duration of the on-time.

Preferably, the off-time regulator further includes a first switch, a second switch, and an inverter. The first switch is connected in series between the voltage-controlled current source and the storage capacitor. The second switch is connected in series between the resistor and ground. The inverter has an input terminal coupled to the output terminal of the hysteretic comparator, and an output terminal coupled to the first switch for controlling opening and closing of the first switch. The output terminal of the hysteretic comparator is coupled to the second switch for controlling opening and closing of the second switch. The first and second switches cooperate to switch the storage capacitor between charging and discharging states.

Yet another object of the present invention is to provide a DC/DC converting device capable of reducing power consumption.

Accordingly, a DC/DC converting device of the present invention includes a voltage converting circuit and a frequency-hopping control module. The voltage converting circuit is operable in a frequency-hopping mode. The frequency-hopping control module includes a high-frequency signal generator, an off-time regulator, and a driving signal-generating circuit, details of which are the same as those described hereinabove.

The frequency-hopping control module of the present invention is capable of regulating duration of the off-time of the control signal according to the output voltage of the voltage-converting circuit, thereby ensuring that the on-time of the control signal has an optimum duration.

BRIEF DESCRIPTION OF THE DRAWINGS

Other features and advantages of the present invention will become apparent in the following detailed description of the preferred embodiment with reference to the accompanying drawings, of which:

FIG. 5 illustrates a hysteresis zone defined by a hysteretic comparator of the off-time regulator of the preferred embodiment;

FIG. 6 is a timing diagram illustrating how the off-time regulator generates a control signal LF;

DETAILED DESCRIPTION OF THE PREFERRED EMBODIMENT

Figure 1:
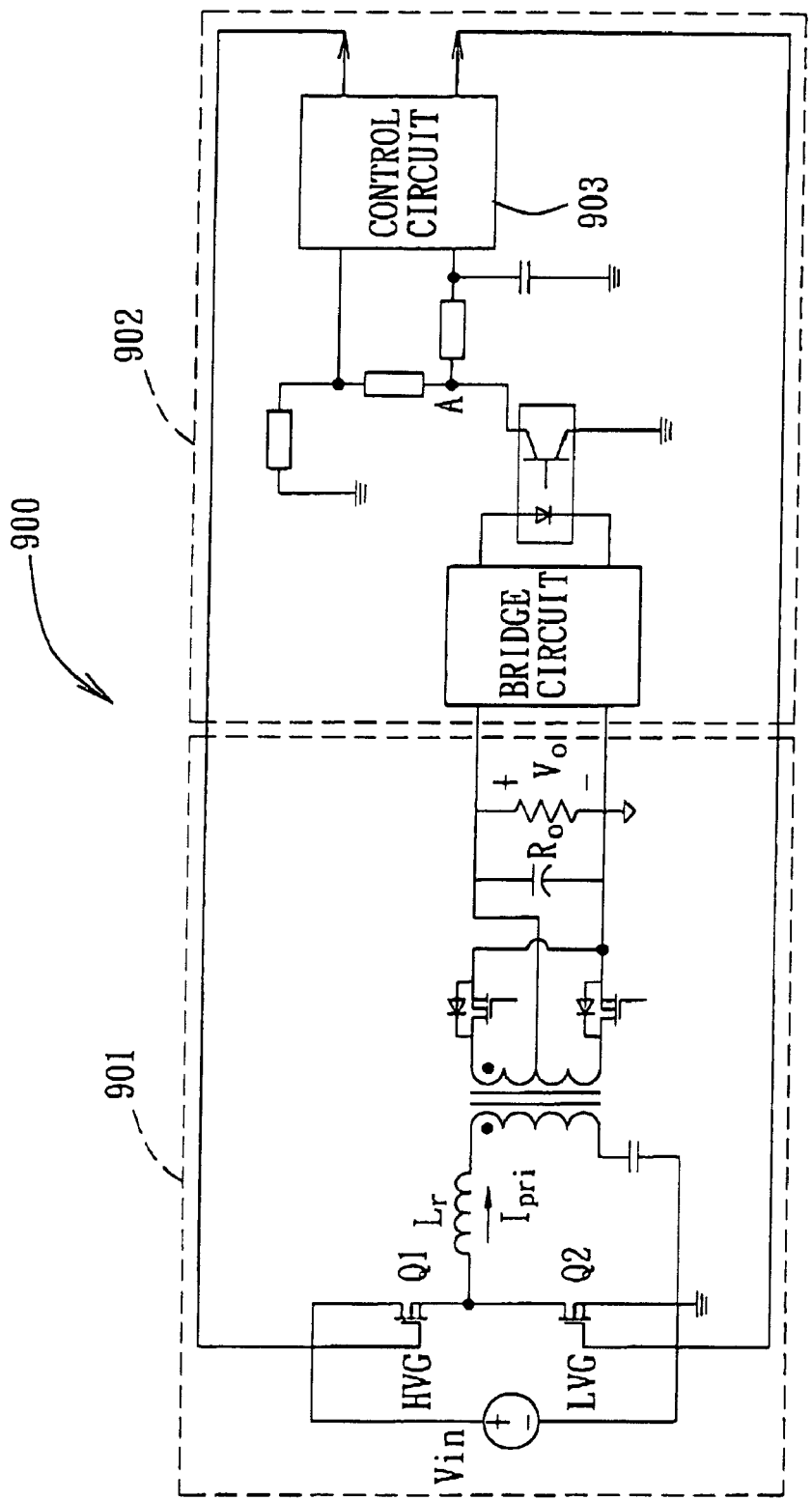
FIG. 1 is a schematic circuit diagram illustrating internal components of a conventional DC/DC converting device.
Figure 2:
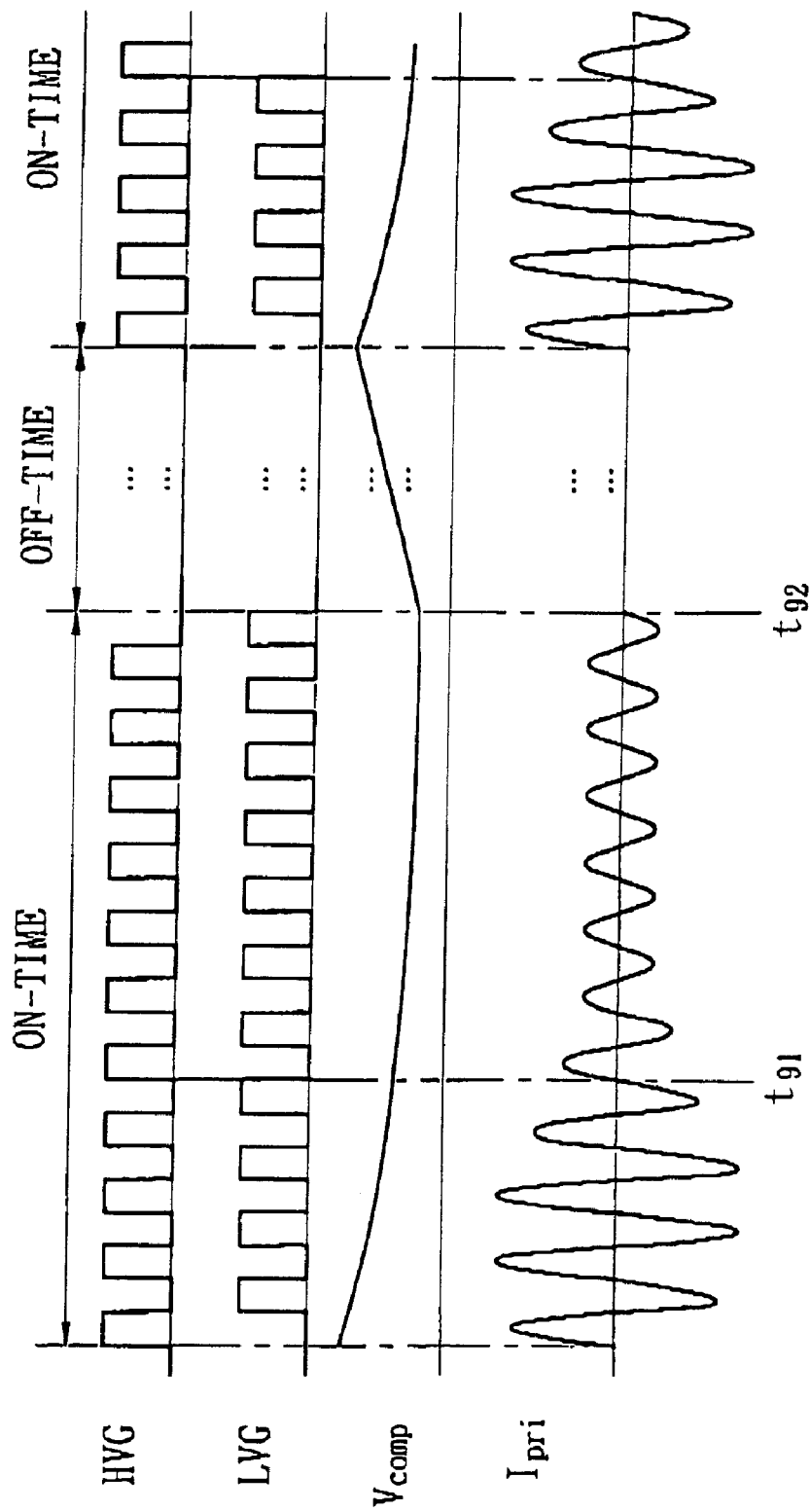
FIG. 2 is a timing diagram to illustrate waveforms of HVG, LVG, $V_{comp}$, and $I_{pri}$ signals in the conventional DC/DC converting device.
Figure 3:
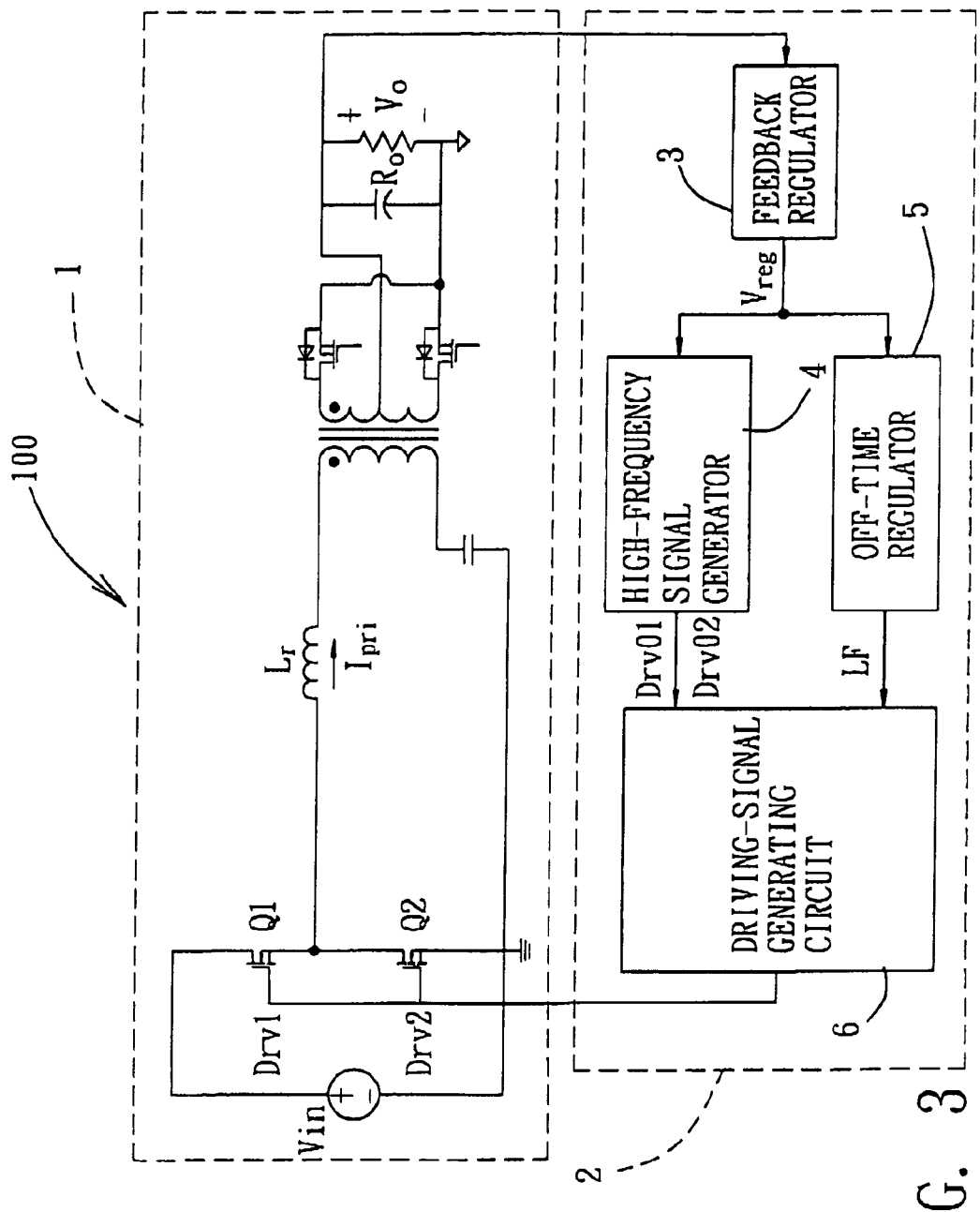
FIG. 3 is a schematic circuit diagram of a DC/DC converting device of the preferred embodiment of the present invention.

Referring to FIG. 3, a DC/DC converting device 100 of the preferred embodiment according to the present invention employs the Frequency-Hopping Spread Spectrum (FHSS) technique to regulate duration of an off-time of a voltage-converting circuit 1 while maintaining duration of an on-time of the voltage-converting circuit 1 constant, thereby transferring energy at a high efficiency and reducing power loss under light load conditions. In the present embodiment, the DC/DC converting device 100 includes the voltage converting circuit 1 and a frequency-hopping control module 2.

The voltage converting circuit 1 can be one of isolated and non-isolated DC/DC converters, such as a buck converter, a boost converter, a buck-boost converter, a flyback converter, a forward converter, and an LLC oscillating circuit. The voltage converting circuit 1 of the preferred embodiment is a half-bridge LLC oscillating circuit and has a first power switch Q1 and a second power switch Q2.

The frequency-hopping control module 2 is for generating driving signals to control the first and second power switches Q1,Q2 of the voltage converting circuit 1. In the present embodiment, the voltage converting circuit 1 operates in a frequency-hopping mode in which the frequency-hopping control module 2 switches the voltage converting circuit 1 between an on-time and an off-time. During the on-time, the frequency-hopping control module 2 outputs the driving signals for driving the voltage converting circuit 1 so that the voltage converting circuit 1 performs voltage conversion. Conversely, the frequency-hopping control, module 2 opens (i.e., turns off) the first and second power switches Q1, Q2 during the off-time so that the voltage converting circuit 1 does not perform voltage conversion. The frequency-hopping control module 2 includes a feedback regulator 3, a high-frequency signal generator 4, an off-time regulator 5, and a driving signal-generating circuit 6.

The feedback regulator 3 is for generating a regulating signal $V_{reg}$ according to an output voltage $V_o$ of the voltage converting circuit 1. The regulating signal $V_{reg}$ is for generating a control signal LF and for controlling switching frequency of the driving signals generated by the driving signal-generating circuit 6. The feedback regulator 3 transmits the regulating signal $V_{reg}$ to the high-frequency signal generator 4, which generates a set of periodic pulse signals Drv01, Drv02, and to the off-time regulator 5, which generates the control signal $L_F$ according to the regulating signal $V_{reg}$. Further details of the high-frequency signal generator 4 and the off-time regulator 5 will be described later in the specification. The driving signal-generating circuit 6 generates the driving signals Drv1,Drv2 for driving the first and second power switches Q1,Q2 according to the pulse signals Drv01, Drv02 and the control signal LF. Preferably, a frequency of the pulse signals Drv01, Drv02 is a maximum allowable switching frequency of the first and second power switches Q1, Q2 of the voltage converting circuit 1.

It is to be noted that, when the load current decreases (due to increasing load resistance $R_o$), the output voltage $V_o$ of the voltage converting circuit 1 increases slightly, and switching frequency of the first and second power switches Q1,Q2 needs to be increased so as to stabilize the output voltage $V_o$. Therefore, the voltage of the regulating signal $V_{reg}$ needs to be decreased. In other words, the output voltage $V_o$ is inversely proportional to the regulating signal $V_{reg}$.

Figure 4:
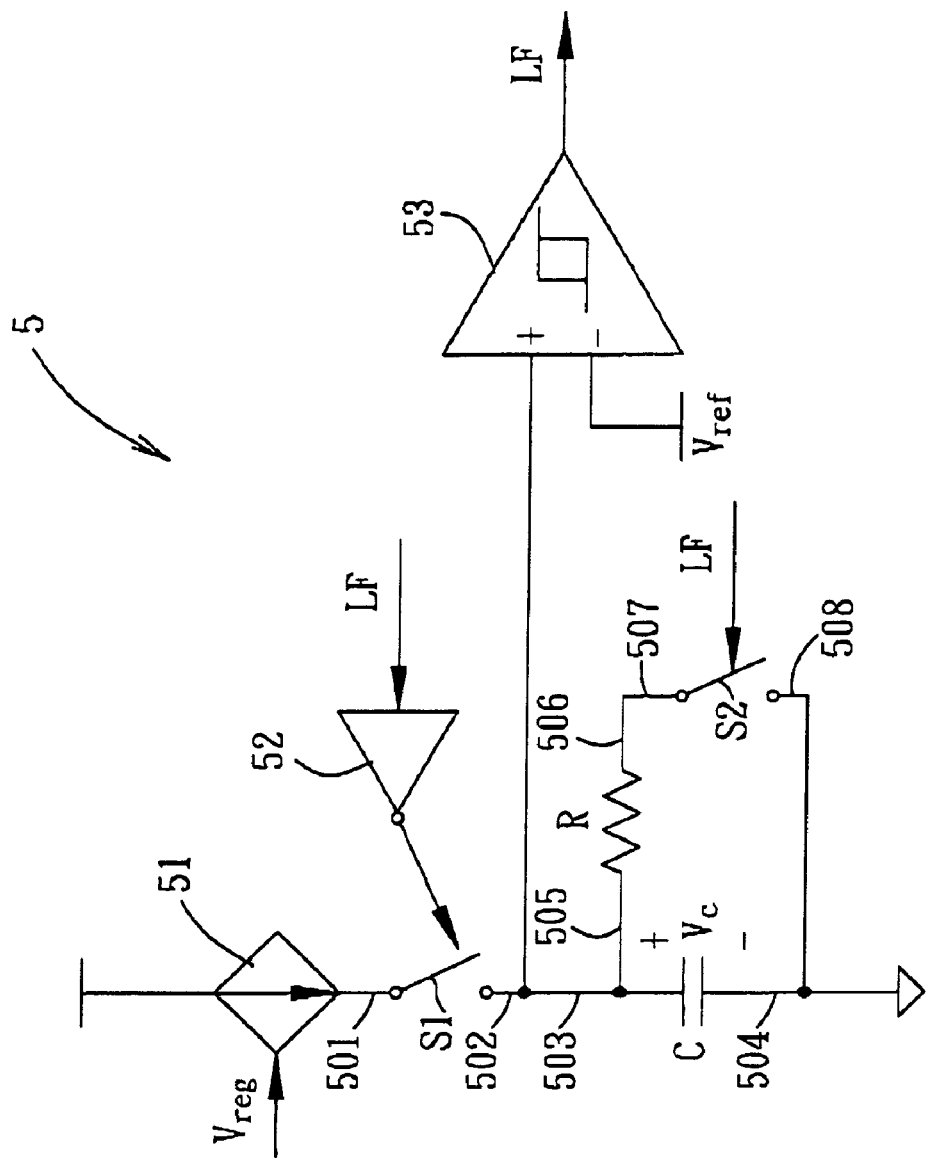
FIG. 4 is a schematic circuit diagram of an off-time regulator of a frequency-hopping control module of the DC/DC converting device of the preferred embodiment.

Referring to FIG. 4, the off-time regulator 5 of includes a voltage-controlled current source 51, a first switch S1, a second switch S2, a storage capacitor C, a resistor R, an inverter 52, and a hysteretic comparator 53.

The voltage-controlled current source 51 adjusts a charging current outputted thereby according to the regulating signal $V_{reg}$. The first switch S1 has a first terminal 501 coupled to the voltage-controlled current source 51, and a second terminal 502. The storage capacitor C has a first terminal 503 coupled to the second terminal 502 of the first switch S1, and a grounded second terminal 504. The resistor R has a first terminal 505 coupled to the first terminal 503 of the storage capacitor C, and a second terminal 506. The second switch S2 has a first terminal 507 coupled to the second terminal 506 of the resistor R, and a grounded second terminal 508. The hysteretic comparator 53 has a non-inverting terminal coupled to the first terminal 503 of the storage capacitor C, an inverting terminal to receive a reference voltage $V_{ref}$, and an output terminal. The input terminal of the inverter 52 is coupled to the output terminal of the hysteretic comparator 53, and the output terminal of the inverter 52 is coupled to the first switch S1 for controlling opening and closing of the first switch S1. The output terminal of the hysteretic comparator 53 is further coupled to the second switch S2 for controlling opening and closing of the second switch S2.

It is to be noted that the hysteretic comparator 53 defines a hysteresis zone according to the reference voltage $V_{reg}$. Referring to FIG. 5, the hysteresis zone defines a first threshold voltage $V_H$ and a second threshold voltage $V_L$ lower than the first threshold voltage $V_H$. In addition, the control signal LF is the signal outputted at the output terminal of the hysteretic comparator 53.

Referring to FIG. 6, initially, the control signal LF is at a low level such that the first switch S1 is closed (i.e., on) and the second switch S2 is open (i.e., off), and the initial voltage $V_c$ of the storage capacitor C is zero. Therefore, upon receiving the regulating signal $V_{reg}$, the voltage-controlled current source 51 generates a corresponding charging current that charges the storage capacitor C (duration between $t_0$-$t_1$). When the voltage $V_c$ of the storage capacitor C is charged to the first threshold voltage $L_1$ ($V_H$), the control signal LF switches to a high level so that the first switch is open and that charging of the storage capacitor C stops.

Figure 8:
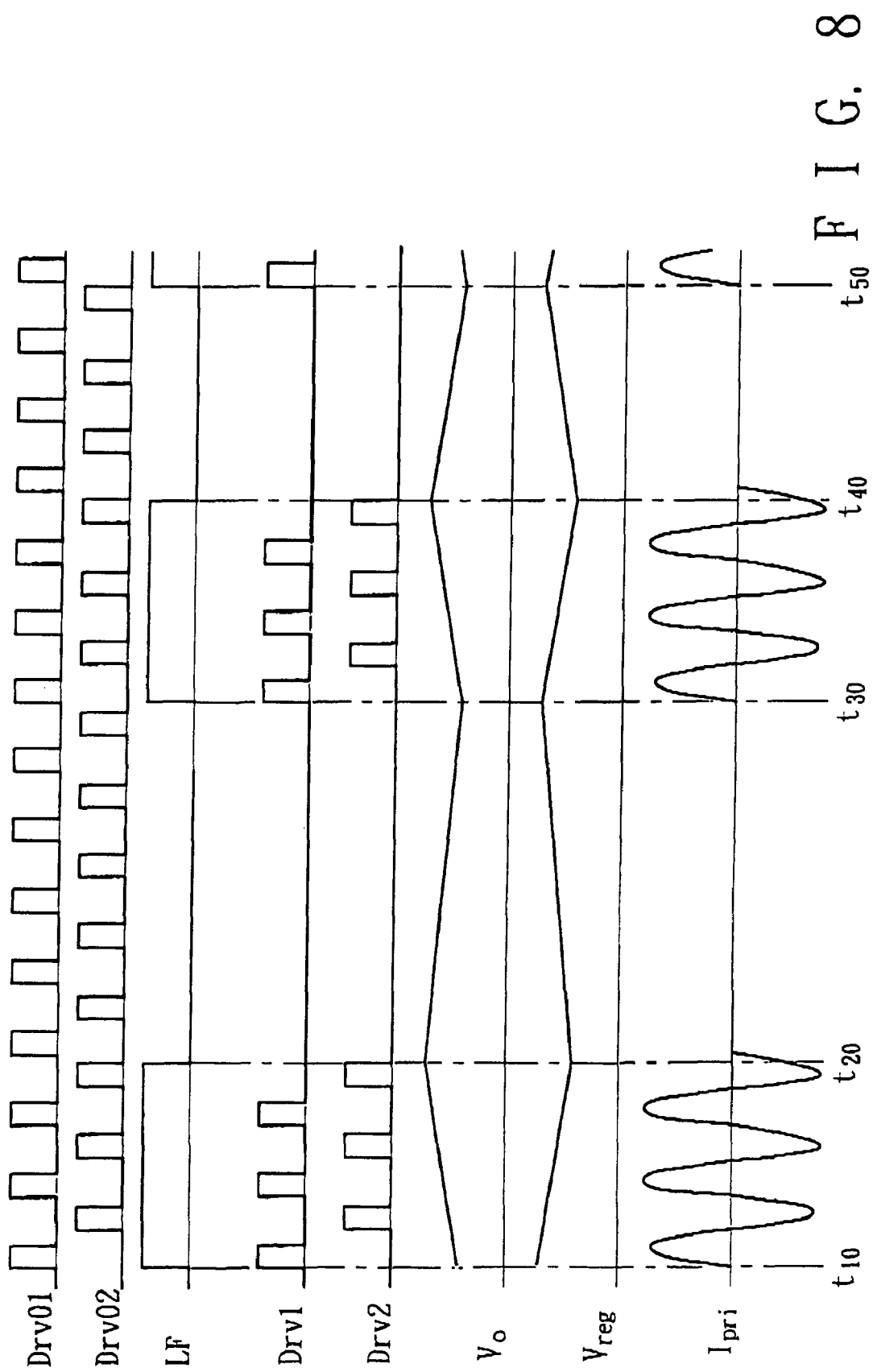
FIG. 8 is a timing diagram to illustrate waveforms of Drv01, Drv02, LF, Drv1, Drv2, $V_o$, $V_{reg}$, and $I_{pri}$ signals in the frequency-hopping control module of the preferred embodiment.

It is to be noted that the control signal LF is cyclical, and each cycle of the control signal LF includes an on-time and an off-time. Duration of charging of the storage capacitor C to the first threshold voltage $L_1$ ($V_H$) is equivalent to duration of the off-time of the control signal LF. The control signal LF is at the low level while the storage capacitor C is charging. In other words, the driving signals Drv1 and Drv2 generated by the driving signal-generating circuit 6 have an on-time and an off-time that correspond to the on-time and the off-time of the control signal LF, as best shown in FIG. 8. The voltage converting circuit 1 operates during the on-time, but not during the off-time.

When the control signal LF switches to the high level, the first switch S1 is open (i.e., off) and the second switch S2 is closed (i.e., on), and the storage capacitor C starts to discharge via the resistor R (duration between $t_1$-$t_2$ in FIG. 6). It is to be noted that duration of discharging of the storage capacitor C is determined by the RC time constant. When the voltage $V_e$ of the storage capacitor C decreases to and drops below the second threshold voltage L2 ($V_L$) defined by the hysteretic comparator 53 during discharging, and the control signal LF is switched to the low level.

In the present embodiment, duration of the on-time of the control signal LF is duration of discharging of the storage capacitor C to the second threshold voltage L2 ($V_L$). During the on-time, the control signal LF is at the high level. Since capacitance of the capacitor C and resistance of the resistor R are fixed, duration of discharging of the storage capacitor C is equal to the RC time constant. That is to say, the on-time of the control signal is a fixed duration of time. In other words, duration of time interval $t_1$-$t_2$ is substantially equal to that of time interval $t_3$-$t_4$. However, duration of time interval $t_2$-$t_3$ is determined by the regulating signal $V_{reg}$: the smaller the regulating signal $V_{reg}$, the longer the duration of charging of the capacitor voltage $V_c$ of the storage capacitor C to the first threshold voltage L1 ($V_H$), and hence the longer the duration of the off-time (e.g., time interval $t_0$-$t_1$) of the control signal LF. Conversely, the larger the regulating signal $V_{reg}$, the shorter the duration of charging of the capacitor voltage $V_e$ of the storage capacitor C to the first threshold voltage L1 ($V_H$), and hence the shorter the duration of the off-time (e.g., time interval $t_2$-$t_3$).

Overall, under circumstances in which the load current decreases (due to increasing load resistance $R_o$), the output voltage $V_o$ of the voltage converting circuit 1 increases, and the voltage of the regulating signal $V_{reg}$ decreases (inversely proportional to each other). Subsequently, the voltage-controlled current source 51 outputs a smaller charging current, the charging duration is lengthened, the off-time of the control signal LF is lengthened, the voltage converting circuit 1 idles for longer duration, and the output voltage $V_o$ drops. Conversely, under circumstances in which the output voltage $V_o$ of the voltage converting circuit 1 drops, the voltage of the regulating signal $V_{reg}$ rises so that the voltage-controlled current source 51 can charge the storage capacitor C with a larger current, thus shortening duration of the off-time while duration of on-time remains unchanged. Therefore, within one operating cycle, the voltage converting circuit 1 performs voltage conversion for a relatively longer on-time such that the output voltage $V_o$ rises. Thus, the frequency-hopping control module 2 can stabilize the output voltage v, of the voltage converting circuit 1.

Figure 7:
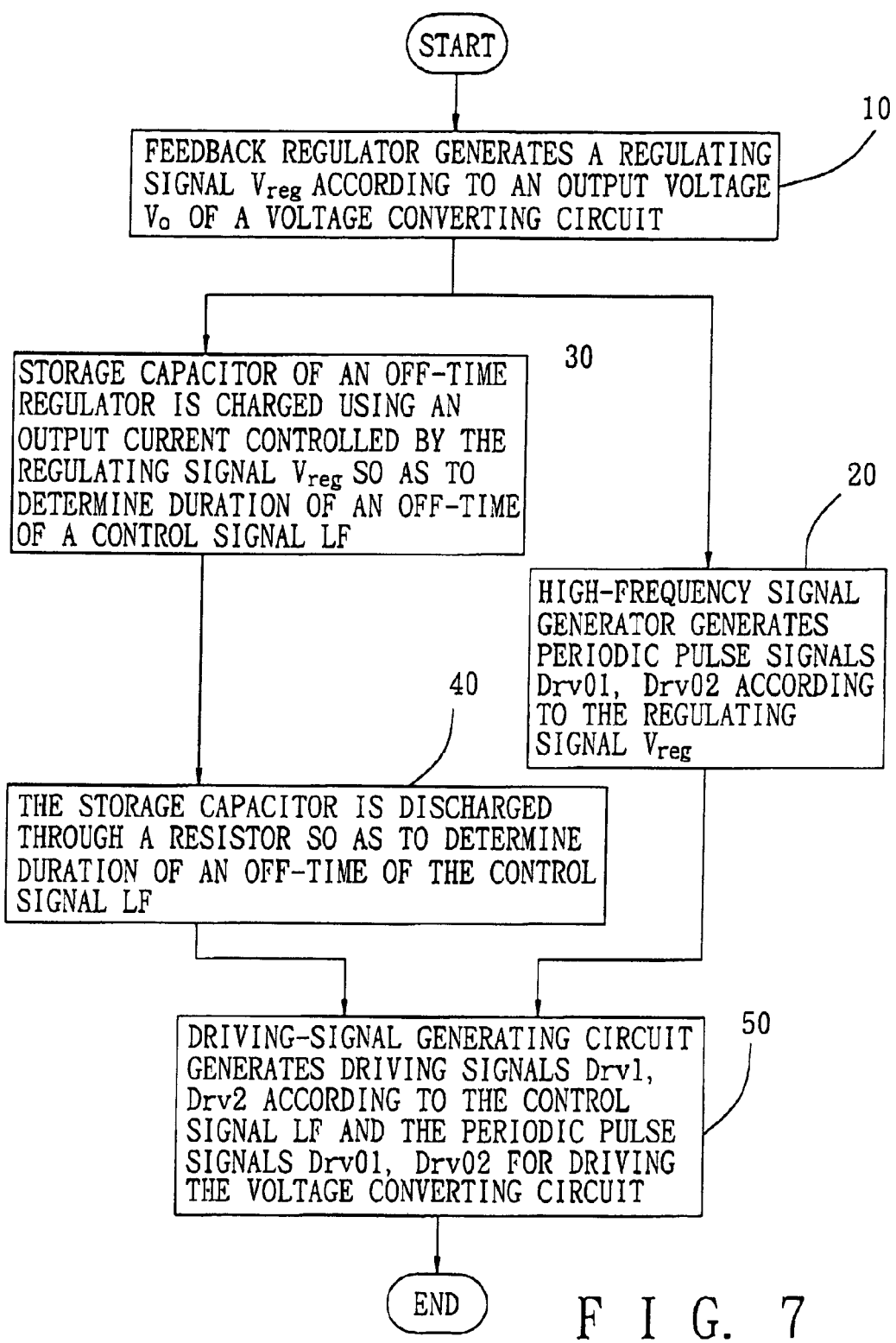
FIG. 7 is a flow chart illustrating consecutive steps of the frequency-hopping control method of the present invention.

The operation of the frequency-hopping control module 2 will now be described with reference to FIGS. 3,7, and 8, in which FIG. 7 is a flow chart of the frequency-hopping control method of the present embodiment, and FIG. 8 is timing diagram to illustrate waveforms of signals generated by the frequency-hopping control module 2.

In step 10, the feedback regulator 3 generates a regulating signal $V_{reg}$ that is inversely proportional to the output voltage $V_o$ of the voltage converting circuit 1, and provides the regulating signal $V_{reg}$ to the high-frequency signal generator 4 and the off-time regulator 5.

In step 20, the high-frequency signal generator 4 generates periodic pulse signals Drv01, Drv02 according to the regulating signal $V_{reg}$. The pulse signals Drv01, Drv02 are provided to the driving signal-generating circuit 6.

While the high-frequency signal generator performs step 20, the off-time regulator 5 performs step 30 and step 90 upon receiving the regulating signal $V_{reg}$.

In step 30, output current of the voltage-controlled current source 51 of the off-time regulator 5 is controlled by the regulating signal $V_{reg}$, and is used to charge the storage capacitor C of the off-time regulator 5 so as to regulate the off-time of the control signal LF, namely time interval $t_{20}$-$t_{30}$. Referring to FIG. 8, in time interval $t_{20}$-$t_{30}$, the slope of the regulating signal $V_{reg}$ is less steeper such that charging of the storage capacitor C to the first threshold voltage $V_H$ is slower, and hence the off-time duration is longer. In contrast, in the time interval $t_{40}$-$t_{50}$, the slope of the regulating signal $V_{reg}$ is relatively steeper such that charging of the storage capacitor C to the first threshold voltage. $V_H$ is faster, and hence the off-time duration is shorter.

In step 40, the off-time regulator 5 controls the on-time of the control signal LF by using the RC time constant of discharging of the storage capacitor C via the resistor R, and the hysteresis zone defined by the hysteretic comparator 53, namely, time interval $t_{10}$-$t_{20}$. In the present embodiment, duration of the on-time is substantially equivalent to duration of three consecutive pulse cycles of either one of the pulse signals Drv01, Drv02. In other words, the capacitance of the storage capacitor C and the resistance of the resistor R need to be properly designed such that the RC time constant is substantially equivalent to three pulse cycles of the pulse signals Drv01, Drv02.

In step 50, the driving signal-generating circuit 6 generates the driving signals Drv1, Drv2 for driving the first and second power switches Q1, Q2 from the pulse signals Drv01, Drv02, and the control signal LF. In the present embodiment, the driving signal-generating circuit 6 is a digital logic circuit that performs a logic AND operation upon the pulse signals Drv01, Drv02 and the control signal LF to generate the driving signals Drv1, Drv2.

Therefore, the driving signals Drv1, Drv2 generated by the driving-signal generating circuit 6 control the opening and closing of the first and second power switches Q1, Q2 so that the storage inductor $L_r$ of the voltage converting circuit 1 charges and discharges. The waveform of the inductor current $I_{pri}$ is shown in FIG. 8.

It is to be noted that duration of the on-time of the control signal LF is not limited to three pulse cycles of either one of the pulse signals Drv01, Drv02. Instead, duration of the on-time can be changed according to need by appropriately designing resistance of the resistor R and capacitance of the capacitor C, or the hysteresis zone of the hysteretic comparator 53. It is also to be noted that only duration of the off-time is regulated, and that duration of the on-time is fixed, while the frequency-hopping control module 2 operates.

In summary, the frequency-hopping control module 2 of the DC/DC converting device 100 of the present invention generates driving signals Drv1, Drv2 each having an on-time with a substantially fixed duration and an off-time with a variable duration such that the output voltage $V_o$ can be stabilized, and that the voltage converting circuit 1 can perform voltage conversion for a preset duration of the on-time so as to reduce power loss and improve voltage conversion efficiency.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A frequency-hopping control method to be performed by a frequency-hopping control module that is suitable for use with a voltage converting circuit and that generates a driving signal for driving the voltage converting circuit when the voltage converting circuit operates in a frequency-hopping mode such that the voltage converting circuit generates an output voltage, comprising the steps of:
   (A) generating a periodic pulse signal;
   (B) generating a control signal according to a regulating signal that is inversely proportional to the output voltage of the voltage converting circuit, wherein the control signal is cyclical and each cycle of the control signal includes an off-time and an on-time, the on-time having a substantially fixed duration, the off-time having a variable duration that has an inverse relation to magnitude of the regulating signal; and
   (C) generating the driving signal according to the control signal and the pulse signal for driving the voltage converting circuit.

2. The frequency-hopping control method as claimed in claim 1, wherein, in step A), a frequency of the periodic pulse signal is a maximum allowable switching frequency of the voltage converting circuit.

3. The frequency-hopping control method as claimed in claim 1, wherein, in step B), the regulating signal is used to control an output current of a voltage-controlled current source, and the duration of the off-time corresponds to duration of charging of a storage capacitor to a first threshold voltage using the output current of the voltage-controlled current source.

4. The frequency-hopping control method as claimed in claim 3, wherein, in step B), the duration of the on-time corresponds to duration of discharging of the storage capacitor via a resistor to a second threshold voltage lower than the first threshold voltage.

5. The frequency-hopping control method as claimed in claim 1, wherein, in step C), the driving signal is generated by performing a logic AND operation upon the control signal and the pulse signal.

6. A frequency-hopping control module suitable for use with a voltage converting circuit and capable of generating a driving signal for driving the voltage converting circuit when the voltage converting circuit operates in a frequency-hopping mode such that the voltage converting circuit generates an output voltage, said frequency-hopping control module comprising:
   a high-frequency signal generator for generating a periodic pulse signal;
   an off-time regulator for generating a control signal according to a regulating signal that is inversely proportional to the output voltage of the voltage converting circuit, wherein the control signal is cyclical and each cycle of the control signal includes an off-time and an on-time, the on-time having a substantially fixed duration, the off-time having a variable duration that has an inverse relation to magnitude of the regulating signal; and
   a driving signal-generating circuit coupled to said high-frequency signal generator and said off-time regulator for generating the driving signal according to the control signal and the pulse signal.

7. The frequency-hopping control module as claimed in claim 6, wherein said off-time regulator includes
   a voltage-controlled current source for generating an output current according to the regulating signal,
   a storage capacitor having a first terminal coupled to said voltage-controlled current source, and a grounded second terminal, and
   a hysteretic comparator having a non-inverting terminal coupled to said first terminal of said storage capacitor, an inverting terminal to receive a reference voltage, and an output terminal, said hysteretic comparator defining a hysteretic zone according to the reference voltage, the hysteretic zone defining a first threshold voltage, said hysteretic comparator limiting duration of charging of said storage capacitor using the output current of said voltage-controlled current source to the first threshold voltage so as to define the duration of the off-time, the control signal of said off-time regulator being outputted from said output terminal of said hysteretic comparator.

8. The frequency-hopping control module as claimed in claim 7, wherein said off-time regulator further includes a resistor having a first terminal coupled to said first terminal of said storage capacitor, and a grounded second terminal, the hysteretic zone further defining a second threshold voltage lower than the first threshold voltage, said hysteretic comparator limiting duration of discharging of said storage capacitor via said resistor to the second threshold voltage so as to define the duration of the on-time.

9. The frequency-hopping control module as claimed in claim 8, wherein said off-time regulator further includes
a first switch connected in series between said voltage-controlled current source and said storage capacitor,
a second switch connected in series between said resistor and ground, and
an inverter having an input terminal coupled to said output terminal of said hysteretic comparator, and an output terminal coupled to said first switch for controlling opening and closing of said first switch,
said output terminal of said hysteretic comparator being coupled to said second switch for controlling opening and closing of said second switch,
said first and second switches cooperating to switch said storage capacitor between charging and discharging states.

10. The frequency-hopping control module as claimed in claim 6, further comprising a feedback regulator for generating the regulating signal according to the output voltage of the voltage converting circuit.

11. The frequency-hopping control module as claimed in claim 6, wherein a frequency of the periodic pulse signal generated by said high-frequency signal generator is a maximum allowable switching frequency of the voltage converting circuit.

12. The frequency-hopping control module as claimed in claim 6, wherein said driving signal-generating circuit performs a logic AND operation upon the control signal and the pulse signal to generate the driving signal.

13. A DC/DC converter comprising:
a voltage converting circuit operable in a frequency-hopping mode to generate an output voltage; and
a frequency-hopping control module including
a high-frequency signal generator for generating a periodic pulse signal,
an off-time regulator for generating a control signal according to a regulating signal that is inversely proportional to the output voltage of the voltage converting circuit, wherein the control signal is cyclical and each cycle of the control signal includes an off-time and an on-time, the on-time having a substantially fixed duration, the off-time having a variable duration that has an inverse relation to magnitude of the regulating signal, and
a driving signal-generating circuit coupled to said high-frequency signal generator, said off-time regulator and said voltage converting circuit for generating a driving signal for driving said voltage converting circuit according to the control signal and the pulse signal.

14. The DC/DC converter as claimed in claim 13, wherein said off-time regulator includes
a voltage-controlled current source for generating an output current according to the regulating signal,
a storage capacitor having a first terminal coupled to said voltage-controlled current source, and a grounded second terminal, and
a hysteretic comparator having a non-inverting terminal coupled to said first terminal of said storage capacitor, an inverting terminal to receive a reference voltage, and an output terminal, said hysteretic comparator defining a hysteretic zone according to the reference voltage, the hysteretic zone defining a first threshold voltage, said hysteretic comparator limiting duration of charging of said storage capacitor using the output current of said voltage-controlled current source to the first threshold voltage so as to define the duration of the off-time, the control signal of said off-time regulator being outputted from said output terminal of said hysteretic comparator.

15. The DC/DC converter as claimed in claim 14, wherein said off-time regulator further includes a resistor having a first terminal coupled to said first terminal of said storage capacitor, and a grounded second terminal, the hysteretic zone further defining a second threshold voltage lower than the first threshold voltage, said hysteretic comparator limiting duration of discharging of said storage capacitor via said resistor to the second threshold voltage so as to define the duration of the on-time.

16. The DC/DC converter as claimed in claim 15, wherein said off-time regulator further includes
a first switch connected in series between said voltage-controlled current source and said storage capacitor,
a second switch connected in series between said resistor and ground, and
an inverter having an input terminal coupled to said output terminal of said hysteretic comparator, and an output terminal coupled to said first switch for controlling opening and closing of said first switch,
said output terminal of said hysteretic comparator being coupled to said second switch for controlling opening and closing of said second switch,
said first and second switches cooperating to switch said storage capacitor between charging and discharging states.

17. The DC/DC converter as claimed in claim 13, wherein said frequency-hopping control module further includes a feedback regulator coupled to said voltage converting circuit and said off-time regulator for generating the regulating signal according to the output voltage of said voltage converting circuit.

18. The DC/DC converter as claimed in claim 13, wherein a frequency of the periodic pulse signal generated by said high-frequency signal generator is a maximum allowable switching frequency of said voltage converting circuit.

19. The DC/DC converter as claimed in claim 13, wherein said driving signal-generating circuit performs a logic AND operation upon the control signal and the pulse signal to generate the driving signal.

20. The DC/DC converter as claimed in claim 13, wherein said voltage converting circuit is a half-bridge LLC oscillating circuit.

* * * * *